(12) United States Patent
Medeiros et al.

(10) Patent No.: US 11,347,309 B1
(45) Date of Patent: May 31, 2022

(54) MONITORING OF INTERACTIONS USING EYE TRACKING

(71) Applicant: Capital One Services, LLC, McLean, VA (US)

(72) Inventors: Alexander Medeiros, Arlington, VA (US); Chelsea Shi, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/212,002

(22) Filed: Mar. 25, 2021

(51) Int. Cl.
| | | |
|---|---|---|
| *G06F 3/01* | (2006.01) | |
| *G06K 9/00* | (2022.01) | |
| *G06F 1/3231* | (2019.01) | |
| *G06F 21/57* | (2013.01) | |
| *G06F 3/02* | (2006.01) | |

(52) U.S. Cl.
CPC ............ *G06F 3/013* (2013.01); *G06F 1/3231* (2013.01); *G06F 3/0227* (2013.01); *G06F 21/577* (2013.01); *G06K 9/00201* (2013.01); *G06K 9/00362* (2013.01); *G06K 9/00604* (2013.01); *G09G 2358/00* (2013.01)

(58) Field of Classification Search
CPC .......... G06F 3/013; G06F 21/32; G06F 21/31; G06F 21/554; G06F 21/577; G06F 1/3231; G06K 9/00362; G06K 9/00221; G06Q 20/40; H04L 9/3231; H04L 63/0861; G09G 2358/00
See application file for complete search history.

(56) References Cited

U.S. PATENT DOCUMENTS

| | | |
|---|---|---|
| 9,640,040 B2 | 5/2017 | Irudayam et al. |
| 10,091,195 B2 | 10/2018 | Lindemann |
| 10,237,070 B2 | 5/2019 | Lindemann |

(Continued)

OTHER PUBLICATIONS

Brudy et al., Is Anyone Looking? Mitigating Shoulder Surfing on Public Displays through Awareness and Protection. Pervasive Displays (PERDIS) Conference, Jun. 2014. Research Report 2014-1056-07, Department of Computer Science, University of Calgary, Calgary, Alberta, Canada T2N 1N4 (Year: 2014).*
Mythreya M. Seetharama et al., "SafetyPIN: Secure PIN Entry Through Eye Tracking", Aug. 2015, pp. 426-435, T. Tryfonas and I. Askoxylakis (Eds.): HAS 2015, LNCS 9190 (11 pages).

(Continued)

*Primary Examiner* — Laurence J Lee
(74) *Attorney, Agent, or Firm* — Bookoff McAndrews, PLLC

(57) ABSTRACT

An electronic interaction device may include an image sensor, a display, a storage device, a memory storing instructions, and a processing unit including one or more processors. The one or more processors may be configured to: receive at least one image of a predetermined space adjacent the electronic interaction device, identify a plurality of persons in the predetermined space adjacent the electronic interaction device, generate a positional mapping of the predetermined space adjacent the electronic interaction device, identify a user and one or more onlookers, extract eye tracking information corresponding to the one or more onlookers, calculate one or more points of focus representing a point at which one of the one or more onlookers is looking, determine whether any of the one or more points of focus is within a predetermined zone of interest of the electronic interaction device, and alert the user.

20 Claims, 6 Drawing Sheets

(56) References Cited

U.S. PATENT DOCUMENTS

2009/0273562 A1* 11/2009 Baliga ............... G06F 3/013
345/157
2020/0081527 A1* 3/2020 Agaoglu ............. G06K 9/0061

OTHER PUBLICATIONS

Vijay Rajanna et al., "Gaze-Assisted User Authentication to Counter Shoulder-surfing Attacks", Mar. 21, 2018, 5 pp.
Erroll Wood and Andreas Bulling, 2014, "EyeTab: model-based gaze estimation on unmodified tablet computers", In Proceedings of the Symposium on Eye Tracking Research and Applications (ETRA '14), GitHub EyeTab, <https://github.com/errollw/EyeTab>, 4 pp.
Vardan Agarwal, "Real-time eye tracking using OpenCV and Dlib", May 4, 2020, <https://towardsdatascience.com/real-time-eye-tracking-using-opencv-and-dlib-b504ca724ac6>, 11 pp.
Satya Mallick, "Gaze Tracking | Learn OpenCV", Nov. 19, 2019, <https://learnopencv.com/gaze-tracking/>, 10 pp.
Joseph Lemley et al., "Efficient CNN Implementation for Eye-Gaze Estimation on Low-Power/Low-Quality Consumer Imaging Systems", Jun. 28, 2018, 9 pp.
Anuradha Kar et al., "A Review and Analysis of Eye-Gaze Estimation Systems, Algorithms and Performance Evaluation Methods in Consumer Platforms", Aug. 7, 2017, 25 pp.
Adrian Rosebrock, "Find distance from camera to object using Python and OpenCV", Pyimagesea Research, <https://www.pyimagesearch.com/2015/01/19/find-distance-camera-objectmarker-using-python-opencv/>, Jan. 19, 2015, 126 pp.

* cited by examiner

MONITORING OF INTERACTIONS USING EYE TRACKING

TECHNICAL FIELD

Various embodiments of the present disclosure relate generally to monitoring an interaction at an electronic interaction device, and more specifically to systems and methods for monitoring an interaction at an electronic interaction device using eye tracking.

BACKGROUND

Kiosks and other similar electronic devices such as ticketing machines, automated teller machines, and self-checkout machines have become increasingly available in recent years in response to growing customer demand for round-the-clock service and convenience. A customer may use such a device to print and pay for a travel ticket, perform a banking transaction, or pay for merchandise. In so doing, a user may provide sensitive information to the device such as a PIN, password, social security number, or payment information.

The device to which the user is providing the sensitive information may be equipped with only rudimentary security mechanisms, if any. For example, the device may include a mirror the user may look into to survey the area behind them and determine whether someone is looking at the device. As another example, the device may include a physical cover intended to shield the user's inputs from view. However, such security mechanisms are generally ineffective and fail to adequately protect the user's information from being compromised.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for monitoring an interaction at an electronic interaction device are described.

In one example, a computer-implemented method for monitoring an interaction at an electronic interaction device may include: collecting a first set of image data comprising at least one image of a predetermined space adjacent the electronic interaction device; identifying, based on the first set of image data, a plurality of persons in the predetermined space in front of the electronic interaction device; generating, based on the first set of image data, a positional mapping of the predetermined space in front of the electronic interaction device, the positional mapping including a position for each of the plurality of persons; identifying, among the plurality of persons and based on the positional mapping, a user and one or more onlookers; extracting, from the first set of image data, eye tracking information corresponding to the one or more onlookers; calculating, based on the eye tracking information, one or more points of focus, each of the one or more points of focus representing a point at which one of the one or more onlookers is looking; determining whether any of the one or more points of focus is within a predetermined zone of interest of the electronic interaction device; and in response to a determination that any of the one or more points of focus is within the predetermined zone of interest, alerting the user via the electronic interaction device.

In another example, an electronic interaction device for monitoring an interaction may include: an image sensor; a display; a storage device; a memory storing instructions; and a processing unit including one or more processors, the one or more processors operatively connected to or in communication with the memory. The one or more processors may be configured to: receive, from the image sensor, a first set of image data comprising at least one image of a predetermined space adjacent the electronic interaction device; store the first set of image data in the storage device; identify, based on the first set of image data, a plurality of persons in the predetermined space adjacent the electronic interaction device; generate, based on the first set of image data, a positional mapping of the predetermined space adjacent the electronic interaction device, the positional mapping including a position for each of the plurality of persons; identify, among the plurality of persons and based on the positional mapping, a user and one or more onlookers; extract, from the first set of image data, eye tracking information corresponding to the one or more onlookers; calculate, based on the eye tracking information, one or more points of focus, each of the one or more points of focus representing a point at which one of the one or more onlookers is looking; determine whether any of the one or more points of focus is within a predetermined zone of interest of the electronic interaction device; and in response to a determination that any of the one or more points of focus is within the predetermined zone of interest, alert the user.

In a further example, a computer-implemented method for monitoring an interaction at an electronic interaction device may include: storing, in a storage device of the electronic interaction device, a three-dimensional mapping of the electronic interaction device, the three-dimensional mapping including position information for components of the electronic interaction device; defining, based on the three-dimensional mapping, a predetermined zone of interest; collecting a first set of image data comprising at least one image of a predetermined space adjacent the electronic interaction device; identifying, based on the first set of image data, a plurality of persons in the predetermined space adjacent the electronic interaction device; generating, based on the first set of image data, a positional mapping of the predetermined space adjacent the electronic interaction device, the positional mapping including a position for each of the plurality of persons; identifying, among the plurality of persons and based on the positional mapping, a user and one or more onlookers; extracting, from the first set of image data, eye tracking information corresponding to the one or more onlookers; calculating, based on the eye tracking information, one or more points of focus, each of the one or more points of focus representing a point at which one of the one or more onlookers is looking; determining whether any of the one or more points of focus is within the predetermined zone of interest; in response to the determination that any of the one or more points of focus is within the predetermined zone of interest of the electronic interaction device, causing an alert message to appear on a display and transmitting a signal to a remote server; and in response to the signal, transmitting, by the remote server, a notification to a user device of the user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
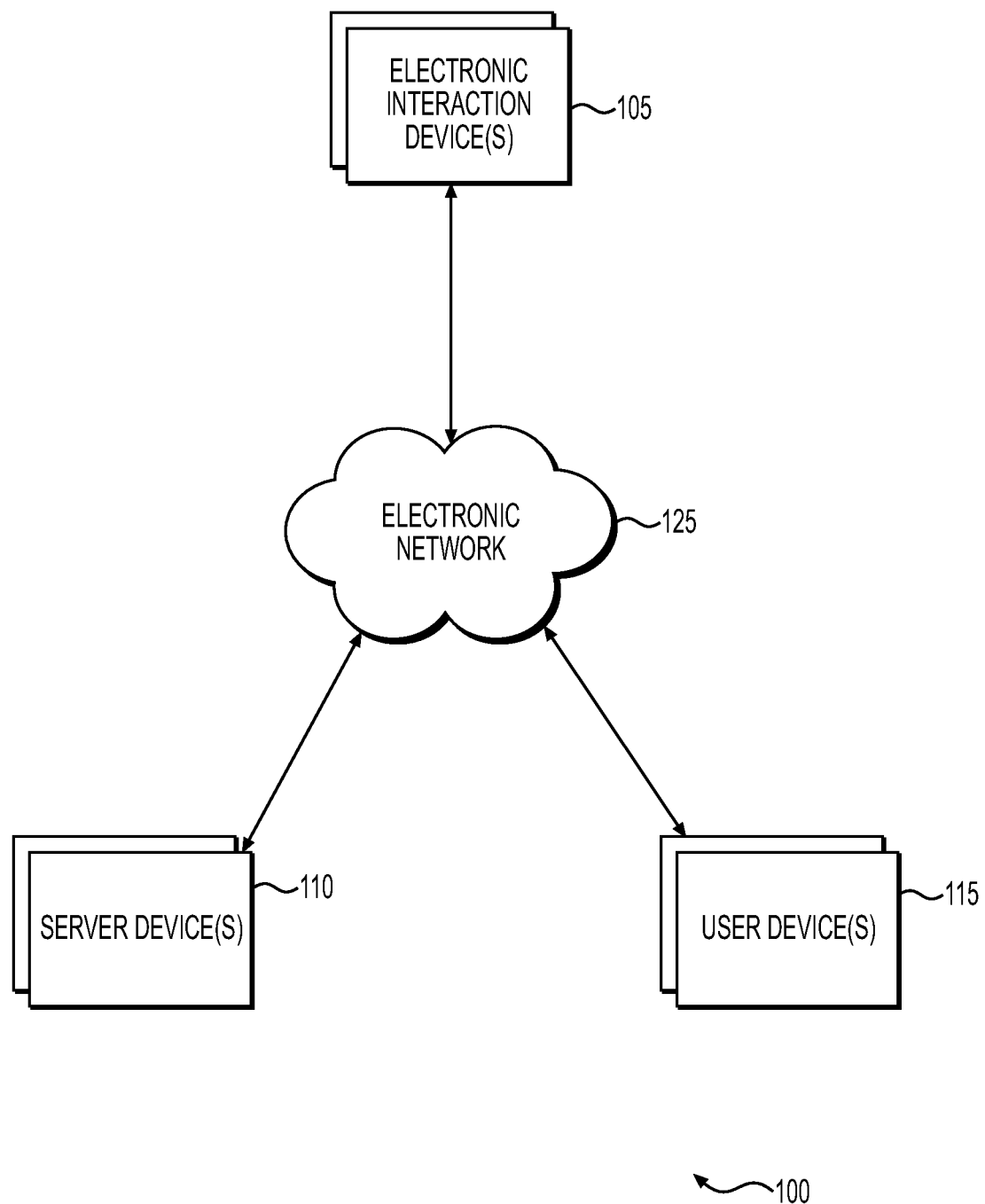
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "electronic interaction device" or the like generally encompasses a computer device with which a user may interact and which may include: electronic kiosks, ticketing machines, payment machines, automated teller machines (ATMs), self-checkout machines, computerized vending machines, identification verification machines, and the like. The term "onlooker" or the like generally encompasses a person other than a user of an electronic interaction device. The term "interaction" or the like generally encompasses any use of an electronic interaction device, including: retrieving a ticket, paying a bill, completing a banking transaction, purchasing merchandise, verifying an identification, and the like.

In general, the present disclosure provides systems and methods for monitoring interactions at electronic interaction devices, and more specifically to systems and methods for monitoring interactions with electronic interaction devices using eye tracking. As will be discussed hereinafter in more detail, the methods and systems according to the present disclosure offer significant technical benefits.

Electronic interaction devices have become ubiquitous in recent years, providing users with improved access to products and services. For example, a ticketing machine may allow a user to access a travel record and print a ticket such as a flight ticket when an attendant is not available. As another example, an ATM may allow a user access to banking resources, such as cash withdrawal or check depositing services, without the need to enter a bank branch. As a further example, self-checkout machines in stores may allow customers to pay for merchandise without needing to be attended to by a cashier.

When a user interacts with an electronic interaction device, the user may provide sensitive information to the electronic interaction device. For example, to access a flight itinerary on a ticketing machine, a user may have to enter personal information such as information relating to a payment card, a social security number, or any other personal information. As another example, when using an ATM, a user may have to enter a personal identification number (PIN), password, or information relating to a payment card or account. As a further example, when using a self-checkout machine, a user may also have to enter information relating to a payment card or an account. In each case, the user may provide sensitive information to the electronic interaction device in order to access a desired service or product.

In using an electronic interaction device, a user may put their sensitive information at risk of being compromised. For example, an electronic interaction device may be located in a high-traffic area where passersby and onlookers may be able to see the sensitive information entered by the user. Also, lines may form at an electronic interaction device when multiple persons wish to use the electronic interaction device. While waiting, persons in the queue may advertently or inadvertently view the user entering sensitive information via a keypad or touchscreen, for example. If the sensitive information is compromised, a user's identity, account, or payment information may be subject to attack.

Security measures for protecting a user's sensitive information may be inadequate. As an example, an electronic interaction device may include a mirror located near eye level of a user and positioned to allow a user to see whether anyone is behind them. However, it may be impractical for a user to both monitor the mirror and attempt to interact with an electronic interaction device at the same time. Accordingly, a user may ignore the mirror entirely in favor of paying attention to a display of an electronic interaction device. As another example security measure, an electronic interaction device may include physical barriers that may obstruct the views of persons other than a user from seeing the sensitive information. For example, a display of an electronic interaction device may be covered by a hood that extends outwardly on one or more sides to prevent onlookers positioned at the one or more sides from seeing the display. Also, a keypad of an electronic interaction device may be covered to prevent onlookers from seeing a user's key selections. The effectiveness of physical barriers like these is limited, however, because the barriers can only extend so far before obstructing a user's ability to interact with an electronic interaction device. Therefore, an onlooker determined to intercept sensitive information may need only reposition themselves slightly to subvert the physical barriers.

Accordingly, a need exists to address the foregoing challenges. Particularly, a need exists to monitor interactions with electronic interaction devices. Embodiments of the present disclosure offer technical solutions to address the foregoing needs, as well as other needs.

FIG. 1 depicts an exemplary computing environment 100 that may be utilized with techniques presented herein. One or more electronic interaction device(s) 105, one or more server device(s) 110, and one or more user device(s) 115 may communicate across an electronic network 125. The user device 115 may be associated with a user. The systems and devices of the computing environment 100 may communicate in any arrangement. As will be discussed herein, systems and/or devices of the computing environment 100 may communicate in order to monitor interactions with the electronic interaction device 105.

The electronic interaction device 105 may be a computer system. In an exemplary embodiment, the electronic interaction device 105 may be a ticketing machine or the like. Alternatively, the electronic interaction device 105 may be an ATM or a self-checkout machine. In some embodiments, the electronic interaction device 105 may include one or more electronic application(s), e.g., a program, plugin, etc., installed on a memory of the electronic interaction device 105. In some embodiments, the electronic application(s) may be associated with one or more of the other components in the computing environment 100. The electronic interaction device 105 may further include a display and a user interface which may be a graphical user interface (GUI).

The user device 115 may be a computer system such as, for example, a desktop computer, a mobile device, etc. In an exemplary embodiment, the user device 115 may be a cellphone, or the like. In some embodiments, the user device 115 may include one or more electronic application(s), e.g., a program, plugin, browser extension, etc., installed on a memory of the user device 115. In some embodiments, the electronic application(s) may be associated with one or more of the other components in the computing environment 100. For example, a web browser or another application or the like configured to provide access to website pages online, such as a travel website or a banking website.

In various embodiments, the electronic network 125 may be a wide area network ("WAN"), a local area network ("LAN"), personal area network ("PAN"), or the like. In some embodiments, electronic network 125 is a secured network. In some embodiments, the secured network may be protected by any of various encryption techniques. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, a portion of the server device 110 may be provided to the electronic interaction device 105 as an electronic portal via an electronic application. Also, a portion of the server device 110 may be provided to the user device 115 as an electronic portal via an electronic application. Any suitable arrangement of the various systems and devices of the computing environment 100 may be used.

In the methods below, various acts are described as performed or executed by one or more components shown in FIG. 1, such as electronic interaction device 105, server device 110, or user device 115. However, it should be understood that in various embodiments, various components or combinations of components of the computing environment 100 discussed above may execute instructions or perform acts including the acts discussed below. Further, it should be understood that in various embodiments, various steps may be added, omitted, and/or rearranged in any suitable manner.

Figure 2:
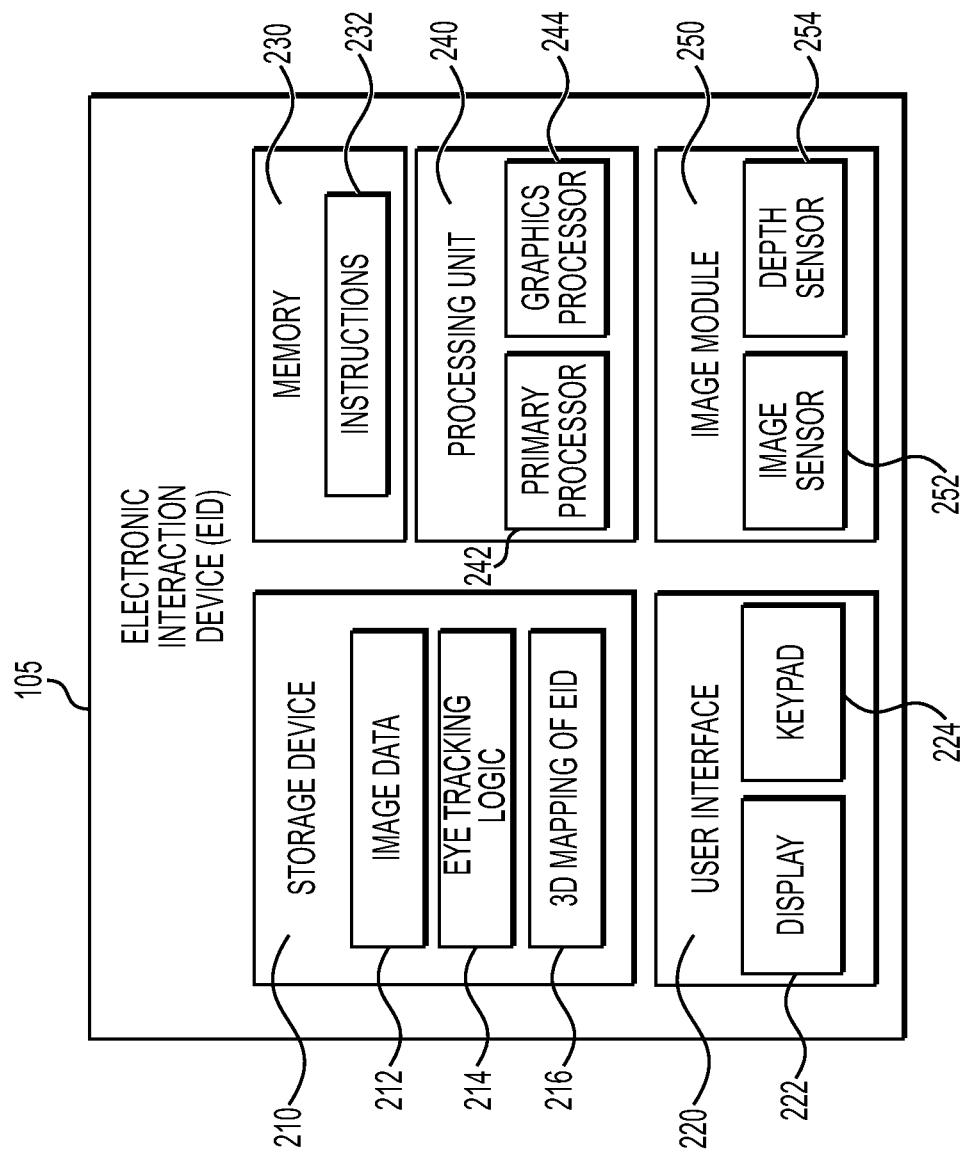
FIG. 2 depicts a functional block diagram of an electronic interaction device, according to one or more embodiments.

FIG. 2 illustrates a functional block diagram of an electronic interaction device 105, according to one or more embodiments. It is to be understood that the electronic interaction device 105 may include fewer than all components shown in FIG. 2 and may also include additional components not shown in FIG. 2.

As shown in FIG. 2, electronic interaction device 105 may include a storage device 210. The storage device 210 may comprise any of a hard disk drive, a partition of a hard disk drive, a solid state drive, a partition of a solid state drive, RAM, ROM, any combination of the foregoing, or any other storage medium configured to store software or data.

The electronic interaction device 105 may further include a user interface 220. The user interface 220 may include a display 222, which may be an LCD, LED, CRT, or any other type of display. The user interface 220 may also include a keypad 224. The keypad 224 may be an alphanumeric keypad, a numeric keypad, or any other type of keypad configured to receive selections by a user. Alternatively, the display 222 and the keypad 224 may be integrated in a touch screen configuration via which a user may input selections to the electronic interaction device 105 by directly touching the display 222. When the electronic interaction device 105 is powered on, a graphical user interface may be depicted on the display 222 via which a user may operate the electronic interaction device 105. A user may use the graphical user interface to submit various interaction requests to the electronic interaction device 105. Such interaction requests may include, for example, requests to retrieve tickets or ticketing information, requests for ATM transactions, requests to pay for merchandise, and other requests. In response to an interaction request, the electronic interaction device 105 may perform the interaction by, for example, exchanging interaction data with the server device 110.

The electronic interaction device 105 may further include a memory 230. The memory 230 may be a RAM or any other suitable storage device, and the memory 230 may store instructions 232. The electronic interaction device 105 may further include a processing unit 240. The processing unit 240 may comprise a primary processor 242 and a graphics processor 244. The primary processor 242 may be a central processing unit (CPU) for the electronic interaction device 105 and may be operatively connected to the memory 230. The primary processor 242 may be further configured to execute the instructions 232. The graphics processor 244 may be operatively connected to the memory 230 and may be further configured to execute the instructions 232.

The electronic interaction device 105 may further include an image module 250 which may comprise an image sensor 252 and a depth sensor 254. One or more of the image sensor 252 and depth sensor 254 may be part of a camera integrated into the electronic interaction device 105 or otherwise in operable communication with the electronic interaction device 105. The image sensor 252 may be configured and oriented such that it is capable of capturing images of a space adjacent the electronic interaction device 105. The space may include, for example, a space in which a user may stand while using the electronic interaction device 105. The space may further include a queue in which persons may wait to use the electronic interaction device 105. The space may also include additional areas beyond the foregoing. The depth sensor 254 may be capable of detecting respective distances of objects from the depth sensor 254, or to otherwise detect a topography of a space. For example, the depth sensor 254 may be configured to detect the distance of various persons, including a user of the electronic interaction device 105, from the depth sensor 254 and/or the electronic interaction device 105. In some embodiments, the depth sensor 254 may be oriented similarly to the image sensor 252 such that the depth sensor is able to detect the respective distances of objects and persons appearing within images captured by the image sensor 252.

Referring back to storage device 210, the storage device 210 may store image data 212 comprising one or more images captured by the image sensor 252. The image data 212 may be stored in any computer-readable format, including as .jpg files, .png files, .bmp files, .gif files, or the like. The image data 212 may further include depth data received from the depth sensor 254. The depth data may include information corresponding to respective topographies of images associated with the image data 212. The image data 212 may be stored in a persistent form or may be stored in transient form. If stored in transient form, the image data 212 may comprise one or more image data sets, where each image data set comprises one or more images captured over a finite time interval. An image data set may correspond to a particular time interval and may be erased after a predetermined time period. An image data set corresponding to an earlier time interval may be overwritten by an image data set corresponding to a later time interval. Storing the image data 212 in transient form may improve the privacy of persons appearing in images captured by the image sensor 252. Moreover, storing the image data 212 in a transient state such that it is continuously overwritten by subsequent image data may decrease an overall storage capacity necessary to operate an electronic interaction device 105, thereby reducing cost.

The storage device 210 may also store eye tracking logic 214. The eye tracking logic 214 may include one or more programs, applications, or executable instructions for processing the image data 212 to identify persons appearing in the one or more images captured by the image sensor 252 and determine respective directions in which the persons are looking. It should be understood that the eye tracking logic 214 may incorporate known techniques for tracking a person's eyes or gaze. Eye tracking logic 214 will be described in further detail hereinafter with reference to FIGS. 4 and 5.

The storage device 210 may further include a positional mapping 216 of the electronic interaction device 105. The positional mapping 216 may be a three-dimensional mapping of the electronic interaction device 105 and its constituent components. The positional mapping 216 may include one or more sets of X, Y, and Z coordinates associated with one or more components of the electronic interaction device 105. For example, the positional mapping 216 may include one or more sets of X, Y, and Z coordinates associated with display 222, one or more sets of X, Y, and Z coordinates associated with the keypad 224, one or more sets of X, Y, and Z coordinates associated with an outer housing of the electronic interaction device 105, and/or one or more sets of X, Y, and Z coordinates associated with any other component of the electronic interaction device 105, including components not specifically described herein.

Figure 3:
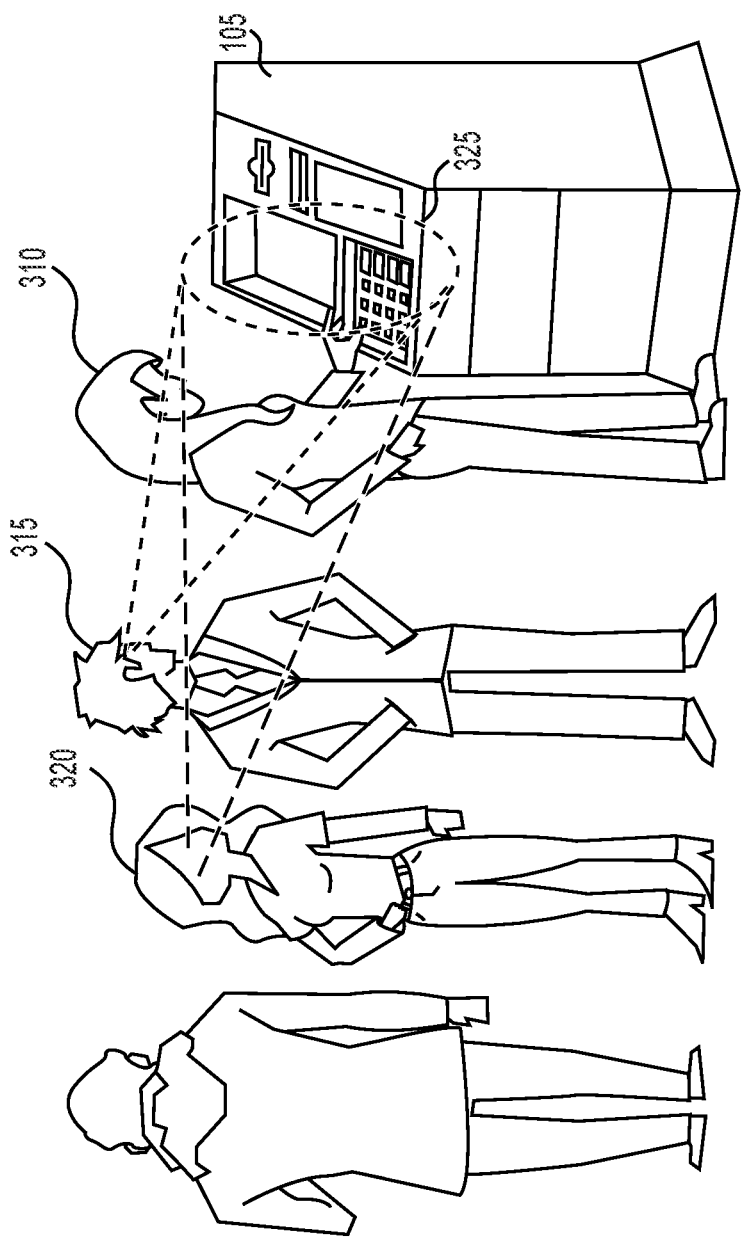
FIG. 3 depicts an example use case for an electronic interaction device, according to one or more embodiments.

FIG. 3 illustrates an exemplary use case for an electronic interaction device 105 as described herein. A user 310 may stand proximate the electronic interaction device 105 and use the electronic interaction device 105. A line of persons waiting to use the electronic interaction device 105, including onlooker 315 and onlooker 320, may form near the user 310, including behind or to the sides of the user 310. When using the electronic interaction device 105, the user 310 may submit sensitive information to the electronic interaction device 105. For example, the user 310 may enter a PIN, password, or other personal information via a keypad, keyboard, or touchscreen. While entering the sensitive information, onlooker 315 may look toward the electronic interaction device 105 and orient his point of focus 325 such that onlooker 315 is able to intercept the sensitive information. The point of focus 325 may include one or more objects on which the onlooker 315 is focusing his gaze. For example, onlooker 315 may orient his point of focus 325 on one or more of a keypad or a display of the electronic interaction device 105. In so doing, onlooker 315 may intercept a PIN or password, for example, entered by user 310. As shown in FIG. 3, onlooker 320 may similarly look toward the electronic interaction device 105 and orient her point of focus 325 such that onlooker 320 is able to intercept the sensitive information. For the sake of simplicity, onlookers 315 and 320 are shown in FIG. 3 as having the same point of focus 325, which may represent a situation in which onlookers 315 and 320 are looking at the same one or more objects. It is to be understood, however, that onlookers 315 and 320 may have independent points of focus that need not match exactly.

Even if user 310 is very vigilant while using the electronic interaction device 105, it may be very difficult for user 310 to ensure that onlookers 315 and 320, for example, do not intercept his sensitive information. Due to how user 310 and onlookers 315 and 320 may be oriented relative to the electronic interaction device 105, e.g., with the user 310 facing the electronic interaction device 105 and the onlookers 315 and 320 waiting in line either behind user 310 or in the periphery of user 310, user 310 may be unaware of where onlookers 315 and 320 are looking. User 310 may also be unaware of whether her sensitive information may be exposed to onlookers 315 and 320. Accordingly, a need exists to monitor an interaction between user 310 and electronic interaction device 105.

Figure 4:
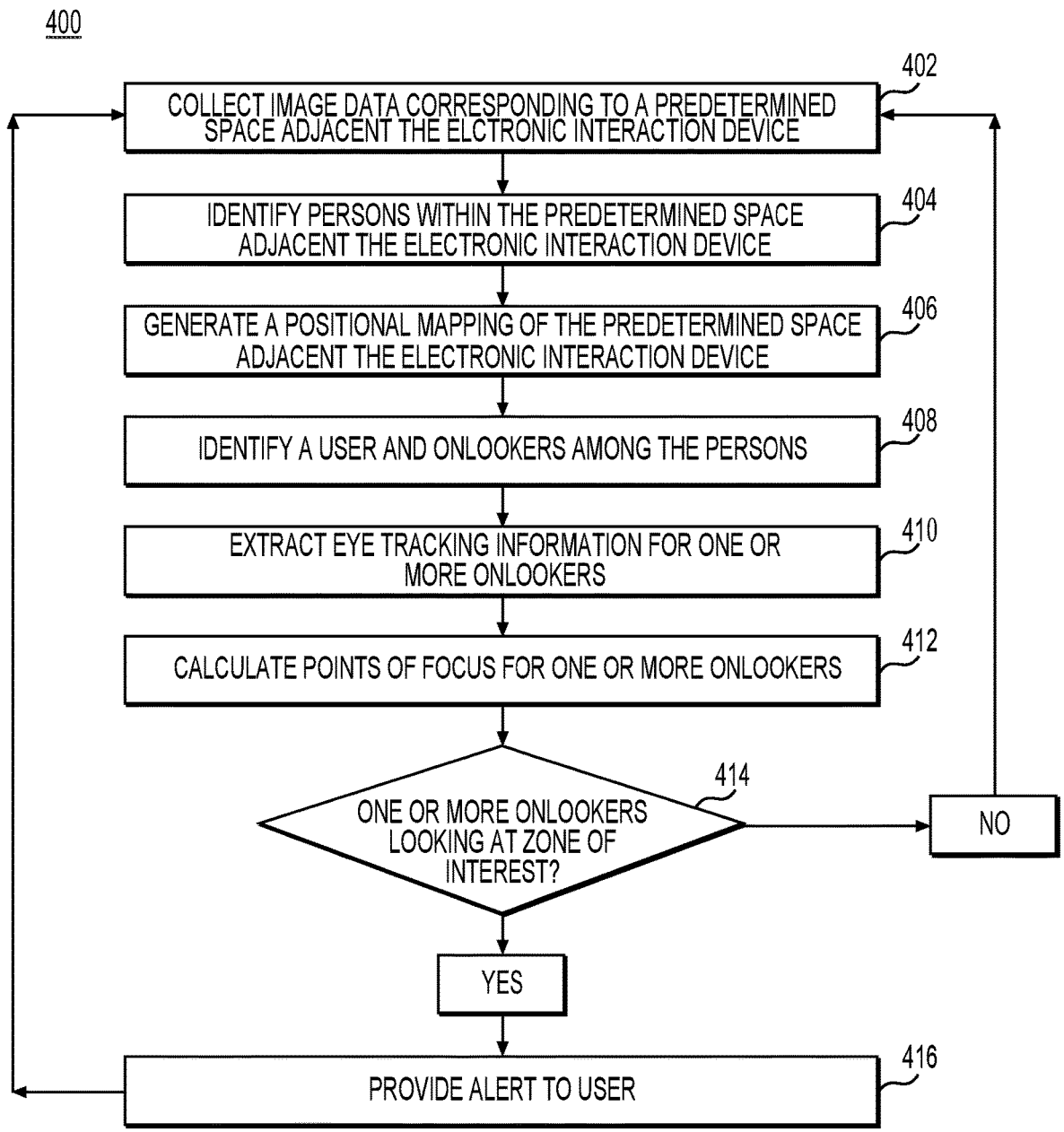
FIG. 4 depicts a flowchart of an exemplary method of alerting a user, according to one or more embodiments.

FIG. 4 illustrates an exemplary process 400 for monitoring an interaction between a user and an electronic interaction device 105 which may use components described herein previously with respect to FIGS. 1 and 2. In some embodiments, process 400 may be triggered by a user initiating use of an electronic interaction device 105. In some embodiments, process 400 may run continuously. At step 402, the electronic interaction device 105 may collect image data corresponding to a predetermined space adjacent to the electronic interaction device 105. The predetermined space may be a space in front of, or to a side of, the electronic interaction device 105 and may include a space in which persons may queue while waiting to use the electronic interaction device 105. The predetermined space may further include a space which, if entered by one or more persons, would render the electronic interaction device 105 visible to the one or more persons. The image data may be collected by the image module 250 and specifically may be collected by one or more of the image sensor 252 and the depth sensor 254. Once it has been collected, the image data may be stored in the storage device 210. The image data may include, for example, one or more images of the predetermined space adjacent to the electronic interaction device 105. In some embodiments, the image data may include one or more photographic images of the predetermined space. The image data may further include depth information associated with objects or persons in the predetermined space or may include a topography of the predetermined space.

At step 404, persons within in the predetermined space adjacent to the electronic interaction device 105 may be identified. The persons may include a user of the electronic interaction device 105 and one or more onlookers where the one or more onlookers are persons other than the user. The one or more onlookers may be persons who are waiting in queue to use the electronic interaction device 105 or may be persons otherwise situated within the predetermined space. The electronic interaction device 105 may identify persons based on the image data and may further identify persons using known image recognition techniques. For example, the electronic interaction device 105 may include a trained and/or trainable machine learning engine or neural network capable of identifying persons based on the image data. In some embodiments, the graphics processor 244 of the electronic interaction device 105 may be configured to identify persons based on the image data. In some embodiments, the electronic interaction device 105 may transmit the image data to server device 110 and server device 110 may identify the persons within the predetermined space.

At step 406, a positional mapping of the predetermined space may be generated. The positional mapping may be a three-dimensional mapping of the predetermined space, including objects and persons within the predetermined space. The positional mapping may include one or more sets of X, Y, and Z coordinates associated with each object or person within the predetermined space. For example, the positional mapping may include one or more sets of X, Y, and Z coordinates associated with a first person within the predetermined space, one or more sets of X, Y, and Z coordinates associated with a second person within the predetermined spaced, and/or one or more sets of X, Y, and Z coordinates associated with any other person or object within the predetermined space. In some embodiments, the positional mapping of the predetermined space may be generated by the electronic interaction device 105 based on the image data. In some embodiments, the electronic interaction device 105 may transmit the image data to server device 110 and server device 110 may generate the positional mapping of the predetermined space.

At step 408, a user and one or more onlookers may be identified from the persons identified in step 404. The user may be a person using or interacting with the electronic interaction device 105 whereas the onlookers may be persons other than the user. In some embodiments, the user and one or more onlookers may be identified by the electronic interaction device 105 based on the positional mapping of the predetermined space. In some embodiments, the user and one or more onlookers may be identified by the server device 110 based on the positional mapping of the predetermined space. A process for identifying the user and the one or more onlookers will be discussed in further detail hereinafter in relation to FIG. 5.

At step 410, eye tracking information for one or more of the onlookers identified at step 408 may be extracted from the image data. In some embodiments, the eye tracking information may include an approximation of a direction in which the one or more onlookers are looking. In some embodiments, the eye tracking information may be extracted, for example, using the eye tracking logic 214 stored in the storage device 210. In some embodiments, the eye tracking information may be extracted by the server device 110. Either the eye tracking logic 214 or the server device 110 may incorporate known techniques for detecting and tracking a person's gaze. In some embodiments, respective faces for the one or more onlookers may be detected based on the image data using a trained and/or trainable machine learning engine or neural network capable of detecting faces. Eyes of the one or more onlookers may then be detected, similarly using a trained and/or trainable machine learning engine or neural network capable of detecting eyes. The irises of the eyes may then be detected and projected onto a flat plane. Based on the shape of the projection of the irises onto the flat plane, one or more vectors representative of the direction in which the onlooker is looking may be generated.

In some embodiments, the eye tracking information may further include optic device tracking information. An optic device may include, for example, binoculars, a telescope, a lens, or any other device configured to focus light. Similar to detecting and tracking an onlooker's gaze, an approximation of a direction in which an optic device is pointed may be determined.

At step 412, respective points of focus for the one or more onlookers may be calculated. As described herein previously, the points of focus may include one or more objects on which the one or more onlookers are focusing their gaze. The points of focus may be calculated using the eye tracking information and positional mapping of the predetermined space. For example, the points of focus may be calculated by superimposing the one or more vectors generated in step 410 on the positional mapping of the predetermined space. In a situation where an onlooker is attempting to intercept the user's sensitive information as it is entered into the electronic interaction device 105, a respective point of focus for the onlooker may include the display 222 or keypad 224 of the electronic interaction device 105, for example. The points of focus may be represented by one or more sets of X, Y, and Z coordinates, for example. In some embodiments, the points of focus may be calculated by the electronic interaction device 105. In some embodiments, the points of focus may be calculated by the server device 110.

At step 414, a determination may be made as to whether any of the one or more onlookers are looking at a zone of interest. The zone of interest may be a predetermined point or area on the electronic interaction device 105 and may include specified components of the electronic interaction device 105, such as keypad 224 or display 222. The zone of interest may be a location on the electronic interaction device 105 by looking at which an onlooker may be able to intercept the user's sensitive information. The zone of interest may be defined based on the positional mapping 216 of the electronic interaction device 105 and may be represented by one or more sets of X, Y, and Z coordinates in the positional mapping 216. The determination may be made as to whether any of the one or more onlookers are looking at the zone of interest based on a comparison of the respective points of focus with the zone of interest. In a case in which a point of focus overlaps with the zone of interest, a determination may be made that at least one of the one or more onlookers may be looking at the zone of interest. If a determination is made that at least one of the one or more onlookers is looking at the zone of interest, process 400 may proceed to step 416. If, on the other hand, a determination is made that none of the one or more onlookers is looking at the zone of interest, process 400 may revert to step 402 and start over. In some embodiments, the determination may be made by the electronic interaction device 105. In some embodiments, the determination may be made by the server device 110.

At step 416, in response to determining that at least one of the one or more onlookers is looking at the zone of interest, an alert may be provided to the user. For example, the electronic interaction device 105 may generate an alert that may appear on the display 222. In some embodiments, the electronic interaction device 105 may generate the alert in response to an instruction received from the server device 110. The electronic interaction device 105 may further blur or otherwise obfuscate any portion of the display 222 not occupied by the alert to prevent the one or more onlookers from intercepting the sensitive information. The alert may include an indication that an onlooker may have intercepted the user's sensitive information. The alert may further include a suggestion to take remedial action, such as resetting the user's credentials.

In some embodiments, in response to a determination at step 414 that one or more onlookers are looking at the zone of interest the electronic interaction device 105 may further transmit a signal to the server device 110 indicating that one or more onlookers may have intercepted the user's sensitive information. In response to receiving the signal, the server device 110 may flag an account associated with the user to indicate that the user's sensitive information may have been compromised. In embodiments in which the server device 110 makes the determination at step 414, the server device 110 may similarly flag the account associated with the user in response to the determination.

Alternatively, or in addition to showing an alert on the display 222, an alert may also be transmitted to the user device 115 by the server device 110. The alert transmitted to the user device 115 may include an indication that an onlooker may have intercepted the user's sensitive information while the user was using the electronic interaction device 105. The alert may further include a suggestion to take remedial action, such as resetting credentials. The alert may be in the form of an SMS message, an MMS message, a push notification, an email, or any other suitable means of communicating with the user device 115. In some embodiments, the alert may prompt the user device 115 to open an application or a browser page allowing the user to reset their credentials, including resetting a PIN and/or password.

It is to be understood that process 400 need not necessarily be performed in the exact order described herein and the steps described herein may be rearranged in some embodiments. Further, in some embodiments fewer than all steps of process 400 may be performed and in some embodiments additional steps may be performed.

Figure 5:
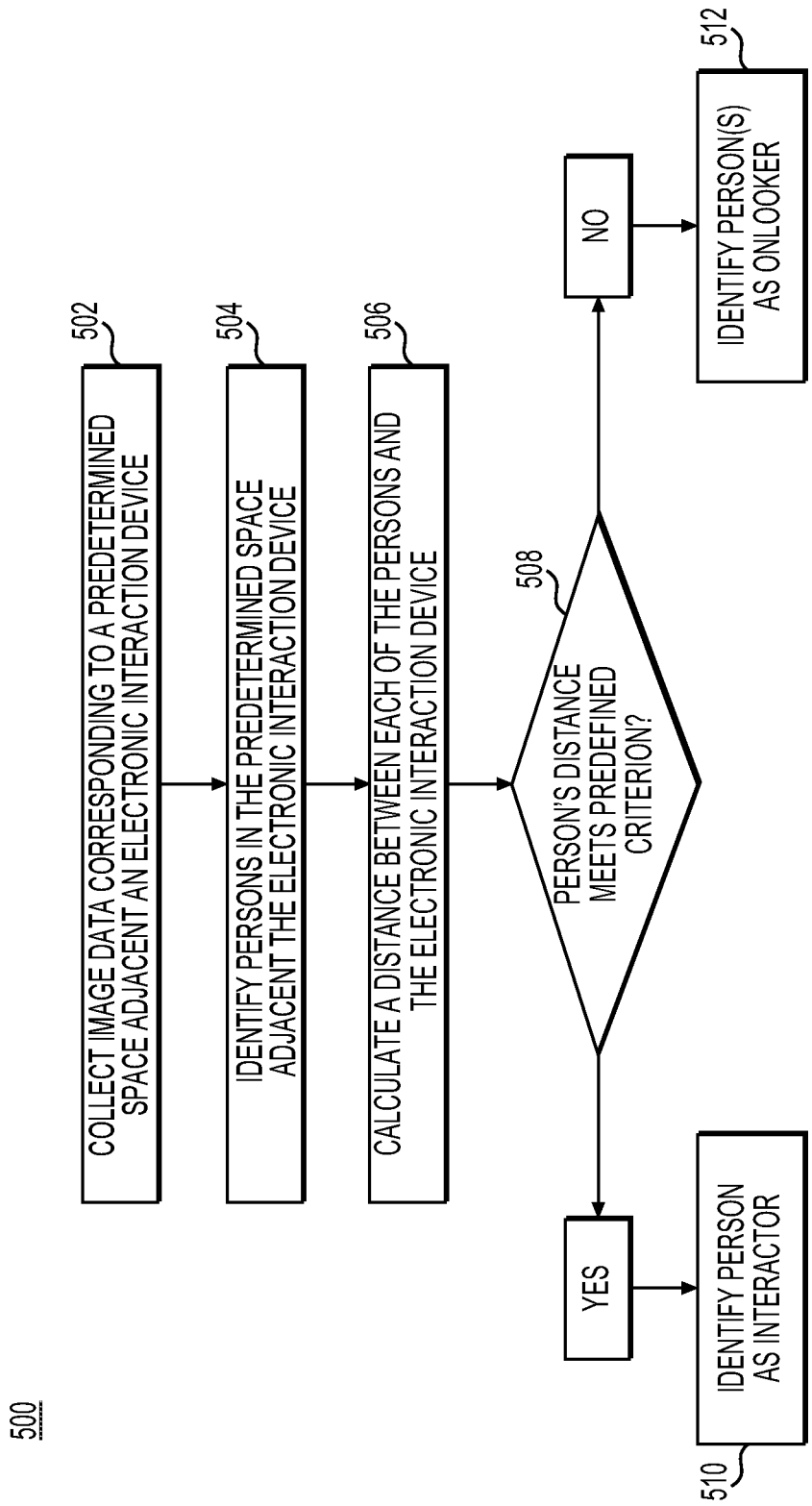
FIG. 5 depicts a flowchart of an exemplary method of identifying an onlooker, according to one or more embodiments.

FIG. 5 depicts an exemplary process 500 for identifying a user and one or more onlookers, which may use components described herein previously with respect to FIGS. 1 and 2. Process 500 may be implemented in conjunction with process 400 as described above. As described hereinafter, process 500 may allow for a distinction to be made between an actual user of the electronic interaction device 105 and onlookers who are to be prevented from intercepting the user's sensitive information.

At step 502, the electronic interaction device 105 may collect image data corresponding to a predetermined space adjacent to the electronic interaction device 105. The image data may be collected by the image module 250 and may be collected by one or more of the image sensor 252 and the depth sensor 254. Once it has been collected, the image data may be stored in the storage device 210. The image data may include, for example, one or more images of the predetermined space adjacent to the electronic interaction device 105. In some embodiments, the image data may include one or more photographic images of the predetermined space. The image data may further include depth information associated with objects or persons in the predetermined space or may include a topography of the predetermined space.

At step 504, persons within the predetermined space adjacent to the electronic interaction device 105 may be identified. The persons may include a user of the electronic interaction device 105 and one or more onlookers where the one or more onlookers are persons other than the user. The one or more onlookers may be persons who are waiting in queue to use the electronic interaction device 105 or may be persons otherwise situated within the predetermined space. The electronic interaction device 105 may identify persons based on the image data and may further identify persons using known image recognition techniques. For example, the electronic interaction device 105 may include a trained and/or trainable machine learning engine or neural network capable of identifying persons based on the image data. In some embodiments, the electronic interaction device 105 may transmit the image data to server device 110 and server device 110 may identify the persons within the predetermined space.

At step 506, respective distances between each of the persons identified in step 504 and the electronic interaction device 105 may be calculated. The respective distances may be calculated based on the image data. For example, the respective distances may be calculated based on depth information collected by the depth sensor 254 in combination with the identifications made in step 504. In some embodiments, the electronic interaction device 105 may calculate the respective distances and in some embodiments, the server device 110 may calculate the respective distances.

At step 508, it may be determined whether the respective distances calculated at step 506 and associated with each person meet a predefined criterion. In some embodiments, the criterion may be that the distance is the shortest of the respective distances. In some embodiments, the criterion may be that the distance is less than a predetermined threshold value. If a respective distance meets the predefined criterion, the process 500 may proceed to step 510. At step 510, a person associated with the distance that meets the criterion may be defined as the user of the electronic interaction device 105. If a respective distance does not meet the predefined criterion, the process 500 may proceed to step 512. At step 512, a person associated with the distance that does not meet the criterion may be defined as an onlooker. In this way, the process 500 may allow accurate identification of the user, who is authorized to see their own sensitive information, and onlookers, who are not. In some embodiments, the electronic interaction device 105 may perform the determination and in some embodiments, the server device 110 may perform the determination.

It is to be understood that process 500 need not necessarily be performed in the order described herein and the steps described herein may be rearranged in some embodiments. Further, in some embodiments fewer than all steps of process 500 may be performed and in some embodiments additional steps may be performed.

Embodiments as described herein may allow for significantly improved experiences for users of an electronic interaction device 105. For example, when using an electronic interaction device 105, a user may feel less of a need to watch onlookers to ensure they are not intercepting their sensitive information. As a result, a user may be able to pay more attention to the electronic interaction device 105 and complete a task more quickly. A user may also feel an increased sense of security. For example, a user may feel that their sensitive information is substantially protected when using an electronic interaction device 105. In the event their sensitive information is intercepted, a user may further feel that they have an adequate opportunity to take remedial actions such as changing account credentials, for example. Further, some embodiments may allow a custodian of an electronic interaction device 105 to take remedial actions to protect a user. For example, if an account associated with a user is flagged for potential interception of sensitive information of an onlooker, the custodian may be able to take proactive steps on behalf of the user to ensure that the sensitive information is not used in a way that is harmful to the user. For example, if an onlooker intercepts a user's ATM PIN, a custodian of the ATM may be able to flag the user's account for potential fraudulent activity and further monitor any activity associated with the user's account. Embodiments as described herein may therefore improve user experience and generate good will for a custodian of an electronic interaction device 105.

Further aspects of the disclosure are discussed below. It should be understood that embodiments in this disclosure are exemplary only, and that other embodiments may include various combinations of features from other embodiments, as well as additional or fewer features.

In general, any process discussed in this disclosure that is understood to be computer-implementable, such as the processes illustrated in FIGS. 4 and 5, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 6:
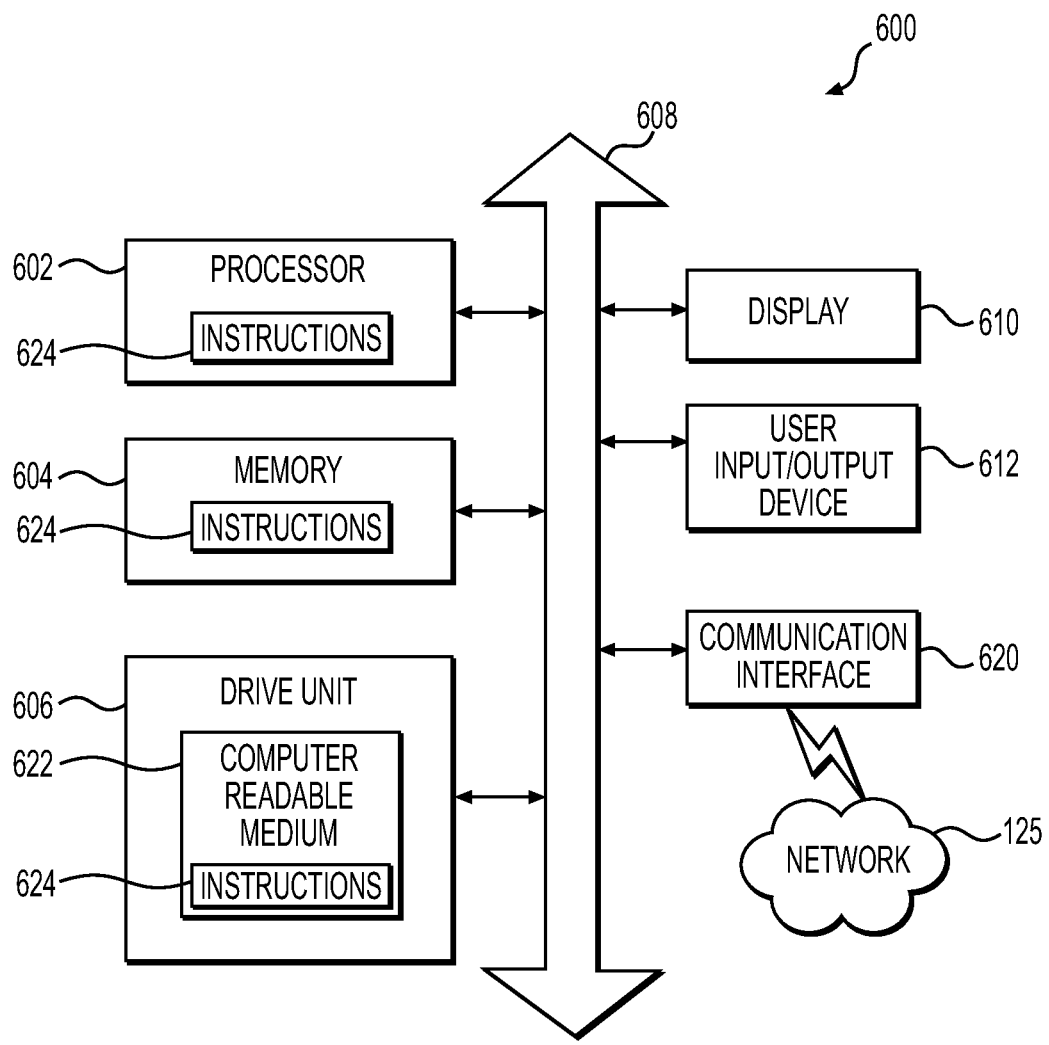
FIG. 6 depicts an example of a computing device, according to one or more embodiments.

FIG. 6 is a simplified functional block diagram of a computer system 600 that may be configured as a device for executing the processes of FIGS. 4 and 5, according to exemplary embodiments of the present disclosure. FIG. 6 is a simplified functional block diagram of a computer that may be configured to serve as either of the server device 110 and the user device 115, according to exemplary embodiments of the present disclosure. In some embodiments, the electronic interaction device 105 may include the components of FIG. 6 in addition to the specific components described herein previously. In various embodiments, any of the systems herein may be an assembly of hardware including, for example, a data communication interface 620 for packet data communication. The platform also may include a central processing unit ("CPU") 602, in the form of one or more processors, for executing program instructions. The platform may include an internal communication bus 608, and a storage unit 606 (such as ROM, HDD, SDD, etc.) that may store data on a computer readable medium 622, although the system 600 may receive programming and data via network communications including via network 125. The system 600 may also have a memory 604 (such as RAM) storing instructions 624 for executing techniques presented herein, although the instructions 624 may be stored temporarily or permanently within other modules of system 600 (e.g., processor 602 and/or computer readable medium 622). The system 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to monitoring an electronic interaction device to protect sensitive information, it should be appreciated that the presently disclosed embodiments may be applicable to monitoring for any other purpose.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 4 and 5 and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for monitoring an interaction at an electronic interaction device, the method comprising:
   collecting a first set of image data comprising at least one image of a predetermined space adjacent the electronic interaction device;
   identifying, based on the first set of image data, a plurality of persons in the predetermined space in front of the electronic interaction device;
   generating, based on the first set of image data, a positional mapping of the predetermined space in front of the electronic interaction device, the positional mapping including a position for each of the plurality of persons;
   identifying, among the plurality of persons and based on the positional mapping, a user and one or more onlookers;
   extracting, from the first set of image data, eye tracking information corresponding to the one or more onlookers;
   calculating, based on the eye tracking information, one or more points of focus, each of the one or more points of focus representing a point at which one of the one or more onlookers is looking;
   determining whether any of the one or more points of focus is within a predetermined zone of interest of the electronic interaction device; and
   in response to a determination that any of the one or more points of focus is within the predetermined zone of interest, alerting the user via the electronic interaction device.

2. The method of claim 1, wherein:
   identifying the user and the one or more onlookers comprises:
      calculating, for each of the plurality of persons, a distance between the position for each of the plurality of persons and the electronic interaction device;
      selecting as the user a person from the plurality of persons corresponding to the distance which is shortest; and
      selecting as the one or more onlookers persons from the plurality of persons other than the user.

3. The method of claim 1, wherein:
   identifying the user and the one or more onlookers comprises:
      calculating, for each of the plurality of persons, a distance between the position and the electronic interaction device;
      determining, for each of the plurality of persons, whether the distance is less than a predetermined threshold value;
      in response to determining that the distance is less than the predetermined threshold value, identifying a person from the plurality of persons corresponding to the distance as the user; and
      selecting as the one or more onlookers persons from the plurality of persons other than the user.

4. The method of claim 1, wherein:
   collecting the first set of image data comprises taking, by a camera in communication with or integrated into the electronic interaction device, at least one photograph of the predetermined space.

5. The method of claim 4, wherein:
collecting the first set of image data further comprises collecting depth information using a depth sensor.

6. The method of claim 1, further comprising:
storing the first set of image data in a storage device of the electronic interaction device.

7. The method of claim 6, further comprising:
collecting a second image data set comprising at least one image of the predetermined space adjacent the electronic interaction device;
erasing the first set of image data in the storage device of the electronic interaction device; and
storing the second set of image data in the storage device of the electronic interaction device.

8. The method of claim 1, wherein:
the electronic interaction device includes a graphics processing unit; and
the graphics processing unit is configured to identify, based on the first set of image data, the plurality of persons in the predetermined space adjacent the electronic interaction device.

9. The method of claim 1, further comprising:
storing a three-dimensional mapping of the electronic interaction device, the three-dimensional mapping including position information for components of the electronic interaction device; and
defining, based on the three-dimensional mapping, the predetermined zone of interest.

10. The method of claim 9, wherein the predetermined zone of interest includes at least one of a keypad and a display.

11. The method of claim 1, wherein alerting the user via the electronic interaction device comprises:
causing an alert message to appear on a display; and
causing an area of the display not occupied by the alert message to be blurred.

12. The method of claim 1, further comprising:
in response to the determination that any of the one or more points of focus is within the predetermined zone of interest of the electronic interaction device, transmitting a signal to a server device, and
in response to the signal, transmitting, by the server device, a notification to a user device of the user.

13. An electronic interaction device for monitoring an interaction, comprising:
an image sensor;
a display;
a storage device;
a memory storing instructions; and
a processing unit including one or more processors, the one or more processors operatively connected to or in communication with the memory and configured to execute the instructions to:
receive, from the image sensor, a first set of image data comprising at least one image of a predetermined space adjacent the electronic interaction device;
store the first set of image data in the storage device;
identify, based on the first set of image data, a plurality of persons in the predetermined space adjacent the electronic interaction device;
generate, based on the first set of image data, a positional mapping of the predetermined space adjacent the electronic interaction device, the positional mapping including a position for each of the plurality of persons;
identify, among the plurality of persons and based on the positional mapping, a user and one or more onlookers;
extract, from the first set of image data, eye tracking information corresponding to the one or more onlookers;
calculate, based on the eye tracking information, one or more points of focus, each of the one or more points of focus representing a point at which one of the one or more onlookers is looking;
determine whether any of the one or more points of focus is within a predetermined zone of interest of the electronic interaction device; and
in response to a determination that any of the one or more points of focus is within the predetermined zone of interest, alert the user.

14. The electronic interaction device of claim 13, wherein the storage device stores a three-dimensional mapping of the electronic interaction device, the three-dimensional mapping including position information for components of the electronic interaction device; and
the predetermined zone of interest is defined based on the three-dimensional mapping.

15. The electronic interaction device of claim 14, further comprising:
a keypad,
wherein the predetermined zone of interest is defined to include at least one of the display and the keypad.

16. The electronic interaction device of claim 13, further comprising:
a depth sensor;
wherein the one or more processors are further configured to execute the instructions to:
receive depth information corresponding to objects in the predetermined space; and
generate, based on the first set of image data and the depth information, the positional mapping of the predetermined space adjacent the electronic interaction device.

17. The electronic interaction device of claim 13, wherein the one or more processors are further configured to execute the instructions to:
calculate, for each of the plurality of persons, a distance between the position for each of the plurality of persons and the electronic interaction device;
select as the user a person from the plurality of persons corresponding to the distance which is shortest; and
select as the one or more onlookers persons from the plurality of persons other than the user.

18. The electronic interaction device of claim 13, wherein the one or more processors includes a graphics processing unit, the graphics processing unit being configured to execute the instructions to:
receive, from the image sensor, the first set of image data;
identify, based on the first set of image data, the plurality of persons; and
extract, from the first set of image data, the eye tracking information corresponding to the one or more onlookers.

19. The electronic interaction device of claim 13, wherein the one or more processors are further configured to execute the instructions to:
cause an alert message to appear on the display; and
cause an area of the display not occupied by the alert message to be blurred.

20. A computer-implemented method for monitoring an interaction at an electronic interaction device, the method comprising:
- storing, in a storage device of the electronic interaction device, a three-dimensional mapping of the electronic interaction device, the three-dimensional mapping including position information for components of the electronic interaction device;
- defining, based on the three-dimensional mapping, a predetermined zone of interest;
- collecting a first set of image data comprising at least one image of a predetermined space adjacent the electronic interaction device;
- identifying, based on the first set of image data, a plurality of persons in the predetermined space adjacent the electronic interaction device;
- generating, based on the first set of image data, a positional mapping of the predetermined space adjacent the electronic interaction device, the positional mapping including a position for each of the plurality of persons;
- identifying, among the plurality of persons and based on the positional mapping, a user and one or more onlookers,
- extracting, from the first set of image data, eye tracking information corresponding to the one or more onlookers,
- calculating, based on the eye tracking information, one or more points of focus, each of the one or more points of focus representing a point at which one of the one or more onlookers is looking,
- determining whether any of the one or more points of focus is within the predetermined zone of interest;
- in response to the determination that any of the one or more points of focus is within the predetermined zone of interest of the electronic interaction device, causing an alert message to appear on a display and transmitting a signal to a server device; and
- in response to the signal, transmitting, by the server device, a notification to a user device of the user.

* * * * *